United States Patent
Kawasaki

(10) Patent No.: US 7,258,090 B2
(45) Date of Patent: Aug. 21, 2007

(54) INTAKE AIR AMOUNT CONTROL APPARATUS FOR INTERNAL COMBUSTION ENGINE

(75) Inventor: Takashi Kawasaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 59 days.

(21) Appl. No.: 11/336,762

(22) Filed: Jan. 23, 2006

(65) Prior Publication Data

US 2006/0162681 A1 Jul. 27, 2006

(30) Foreign Application Priority Data

Jan. 25, 2005 (JP) .............................. 2005-017151

(51) Int. Cl.
*F01L 1/34* (2006.01)
(52) U.S. Cl. ................. 123/90.16; 123/90.15; 123/197.1; 123/345; 123/347
(58) Field of Classification Search .............. 123/90.16
See application file for complete search history.

(56) References Cited

U.S. PATENT DOCUMENTS

| | | | |
|---|---|---|---|
| 6,425,357 B2 * | 7/2002 | Shimizu et al. | 123/90.16 |
| 7,052,435 B2 * | 5/2006 | Tabata et al. | 477/107 |
| 7,115,065 B2 * | 10/2006 | Tabata et al. | 477/3 |
| 2004/0050363 A1 | 3/2004 | Yamaoka et al. | |
| 2004/0259682 A1 | 12/2004 | Tabata et al. | |
| 2005/0001480 A1 | 1/2005 | Tabata et al. | |

FOREIGN PATENT DOCUMENTS

| | | |
|---|---|---|
| EP | 1 400 671 42 | 3/2004 |
| JP | A 2001-263015 | 9/2001 |
| JP | A-2002-195061 | 7/2002 |

OTHER PUBLICATIONS

"Manual for Mark II" issued by Toyota Jidosha Kabushiki Kaisha in Sep. 1996.

* cited by examiner

*Primary Examiner*—Thomas Denion
*Assistant Examiner*—Kyle M. Riddle
(74) *Attorney, Agent, or Firm*—Oliff & Berridge, PLC

(57) ABSTRACT

An intake air amount control apparatus is mounted on a vehicle having an automatic transmission 30 that switches the shifting pattern for the gear ratio between two modes. The intake air amount control apparatus controls the intake air amount by cooperation of a variable valve lift mechanism 25 that changes the lift integration value of an intake valve 11 and a throttle valve 23 located in an intake passage 22. When the shifting pattern for the gear ratio is in a sport mode, which gives priority to acceleration performance, the intake air amount control apparatus executes a lift varying control such that the lift integration value of the intake valve 11 is greater than when the shifting pattern is in normal mode, which gives priority to fuel economy.

15 Claims, 4 Drawing Sheets

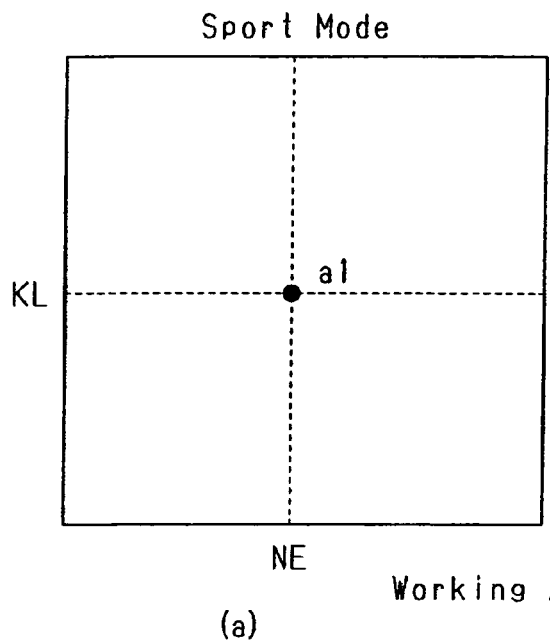
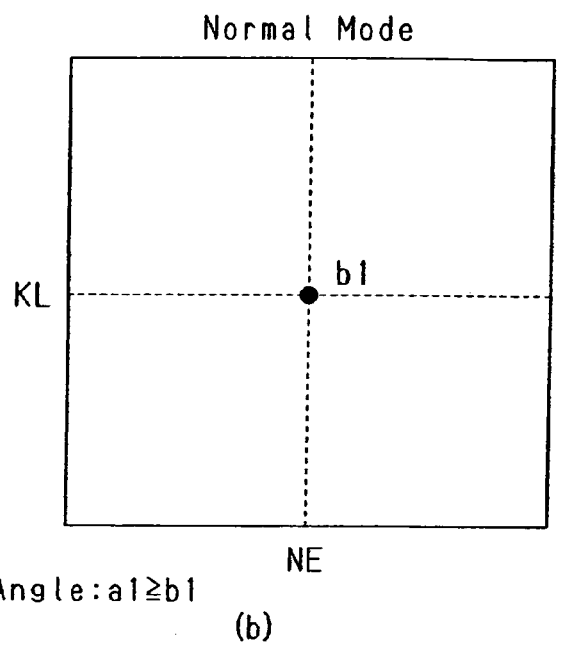
Fig.4(A) Sport Mode (a)
Fig.4(B) Normal Mode (b)
Working Angle: a1≧b1
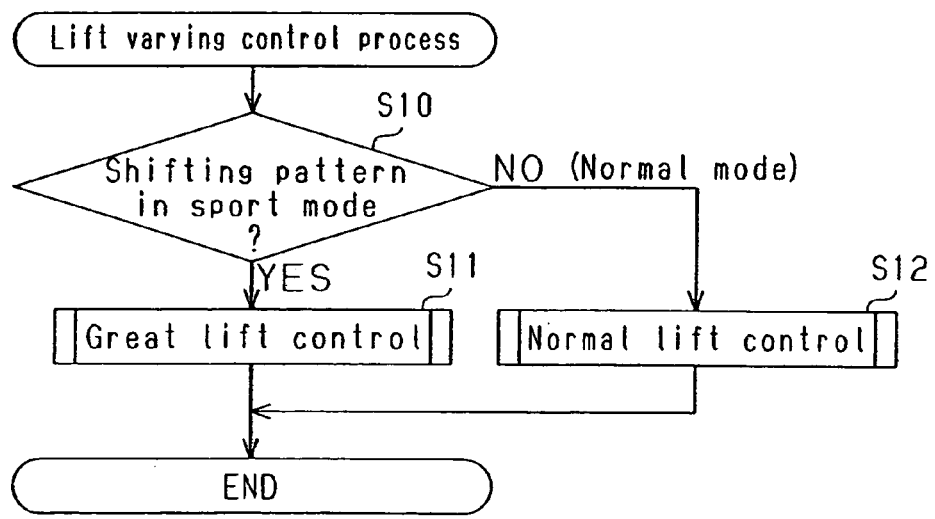
Fig.5

INTAKE AIR AMOUNT CONTROL APPARATUS FOR INTERNAL COMBUSTION ENGINE

BACKGROUND OF THE INVENTION

The present invention relates to an intake air amount control apparatus for an internal combustion engine mounted on a vehicle provided with an automatic transmission.

An automatic transmission for a vehicle sets the shifting pattern for the gear ratio in accordance with the maximum power of the engine and the driving characteristics required for the vehicle. According to the shifting pattern, the gear ratio is changed according to, for example, the depression degree of the accelerator pedal and the vehicle speed.

For example, "Manual for Mark II" issued by TOYOTA JIDOSHA KABUSHIKI KAISHA in September, 1996 discloses an automatic transmission that is capable of changing the shifting pattern for the gear ratio according to the operating condition of the vehicle. When giving more priority to fuel economy than acceleration performance of the vehicle, this type of automatic transmission permits the gear ratio to be reduced at a time earlier as compared to the time of shifting up by a conventional automatic transmission. Also, it permits the gear ratio to be reduced at a time later as compared to the time of shifting up by a conventional automatic transmission when giving more priority to acceleration performance than fuel economy. In this manner, the shifting pattern for the gear ratio is switched between a mode for giving priority to fuel economy and a mode for giving priority to acceleration performance, so that the driving characteristic desired by the driver is obtained.

In a vehicle internal combustion engine, intake air amount is adjusted by changing the opening degree of the throttle valve. Decrease in the opening degree of the throttle valve increases pumping loss. This could in turn reduce fuel economy. In this respect, Japanese Laid-Open Patent Publication No. 2001-263015 discloses a variable valve actuation mechanism that changes the maximum lift of intake valves according to the operating state of the engine. The variable valve actuation mechanism is capable of increasing the opening degree of the throttle valve while reducing the maximum lift of the intake valves when the intake air amount required for operating the engine is small, for example, when the engine is idling. Accordingly, pumping loss is reduced during low load operation of the engine. This improves the fuel economy.

While the technique for switching the shifting pattern for the gear ratio is designed for improving the acceleration performance of vehicles, the technique for changing the maximum lift of intake valves using a variable valve actuation mechanism is designed for improving the fuel economy of the vehicle. Since the purposes of the techniques conflict with each other, applying these to an actual vehicle creates problems in terms of vehicle driving characteristics.

That is, when the gear ratio shifting pattern is switched to a mode for giving priority to acceleration performance, if the maximum lift of intake valves is reduced by the variable valve actuation mechanism, it takes a relatively long time for the intake air amount to reach maximum. In this case, the variable valve actuation mechanism is controlled to gradually increasing the maximum lift of the intake valves. The variable valve actuation mechanism however starts operating with a response delay. Thus, despite the fact that the gear ratio shifting pattern has been switched to the mode for giving priority to acceleration performance, the engine cannot produce great torque. The acceleration performance of the vehicle therefore cannot be sufficiently improved.

SUMMARY OF THE INVENTION

Accordingly, it is an objective of the present invention to provide an intake air amount control apparatus for an internal combustion engine mounted on a vehicle provided with an automatic transmission that changes the gear ratio shifting pattern, which apparatus improves the acceleration performance of the vehicle.

One aspect of the present invention is an intake air amount control apparatus for an internal combustion engine mounted on a vehicle provided with an automatic transmission having a gear ratio, in which the engine includes an intake passage and an intake valve having a lift integration value. The intake air amount control apparatus includes a throttle valve located in the intake passage of the engine, a variable valve actuation mechanism that changes the lift integration value of the intake valve of the engine, and an electronic control unit that controls intake air amount of the engine. The electronic control unit controls the intake air amount by cooperation of the throttle valve and the variable valve actuation mechanism. The electronic control unit changes the gear ratio of the automatic transmission based on a predetermined parameter representing an operating condition of the vehicle. The electronic control unit is capable of switching a shifting pattern for the gear ratio between a first mode and a second mode. The gear ratio being set higher in the second mode than in the first mode. When the shifting pattern for the gear ratio is in the second mode, the electronic control unit controls the variable valve actuation mechanism such that the lift integration value is greater than when the shifting pattern is in the first mode.

A further aspect of the present invention is an intake air amount control method for an internal combustion engine mounted on a vehicle provided with an automatic transmission having a gear ratio, in which the engine includes an intake passage with a throttle valve therein, and an intake valve having a lift integration value. The method includes: changing the gear ratio of the automatic transmission based on a predetermined parameter representing an operating condition of the vehicle; switching a shifting pattern for the gear ratio between a first mode and a second mode, with the gear ratio being set higher in the second mode than in the first mode when changing the gear ratio; controlling intake air amount of the engine by cooperation of a variable valve actuation mechanism that changes the lift integration value of the intake valve and a throttle valve located in an intake passage of the engine; and controlling the variable valve actuation mechanism, when the shifting pattern for the gear ratio is in the second mode, such that the lift integration value is greater than when the shifting pattern is in the first mode.

BRIEF DESCRIPTION OF THE DRAWINGS

FIG. 4(A) is a map for computing the working angle of the intake valve when the gear ratio shifting pattern is set to a sport mode;

FIG. 4(B) is a map for computing working angle of the intake valve when the gear ratio shifting pattern is set to normal mode;

FIG. 5 is a flowchart showing a procedure for changing the lift of the intake valve.

DETAILED DESCRIPTION OF THE PREFERRED EMBODIMENTS

A preferred embodiment of the present invention will now be described with reference to FIGS. 1 to 6.

Figure 1:
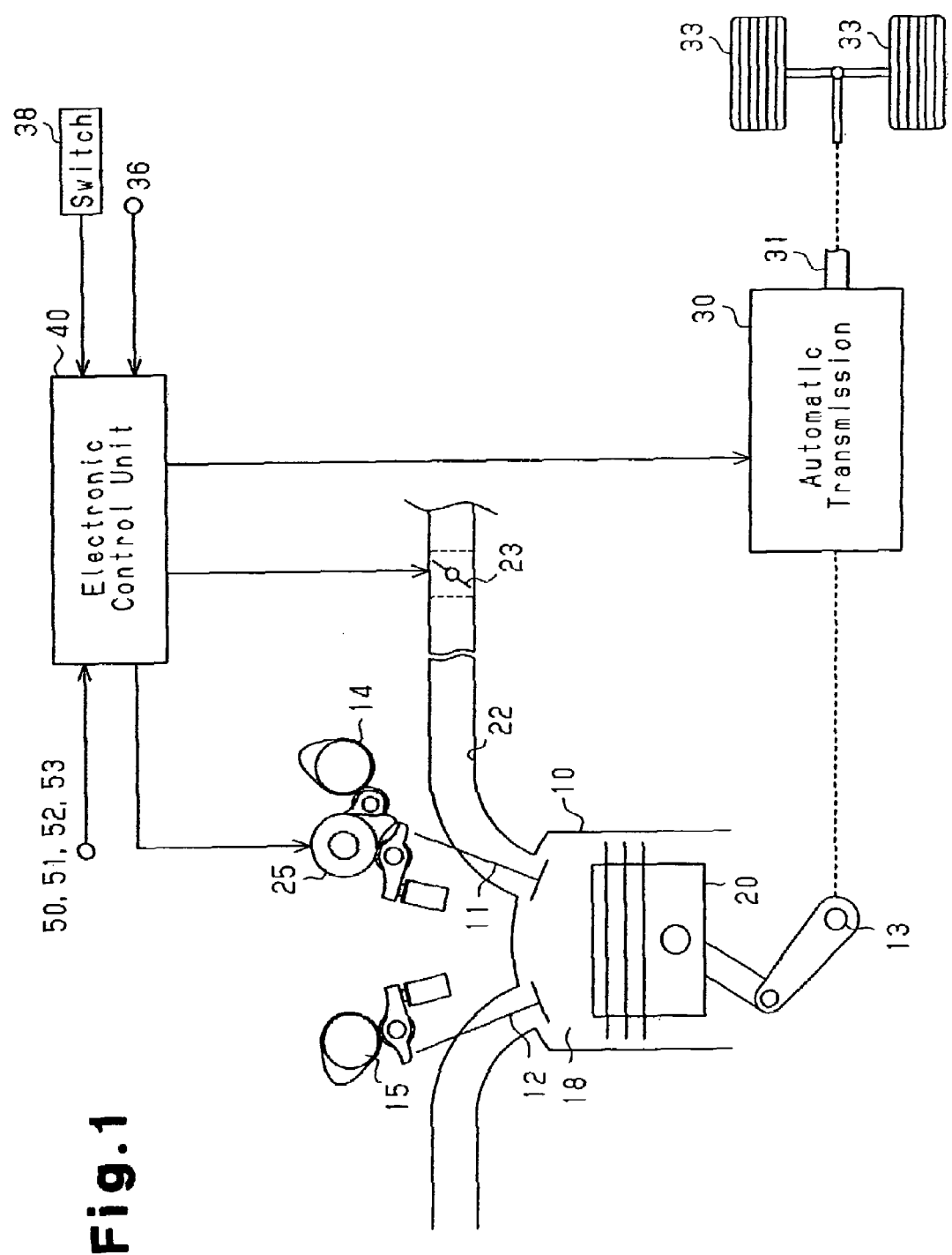
FIG. 1 is a schematic view showing the entire configuration of an intake air amount control apparatus according to a preferred embodiment.
Figure 2:
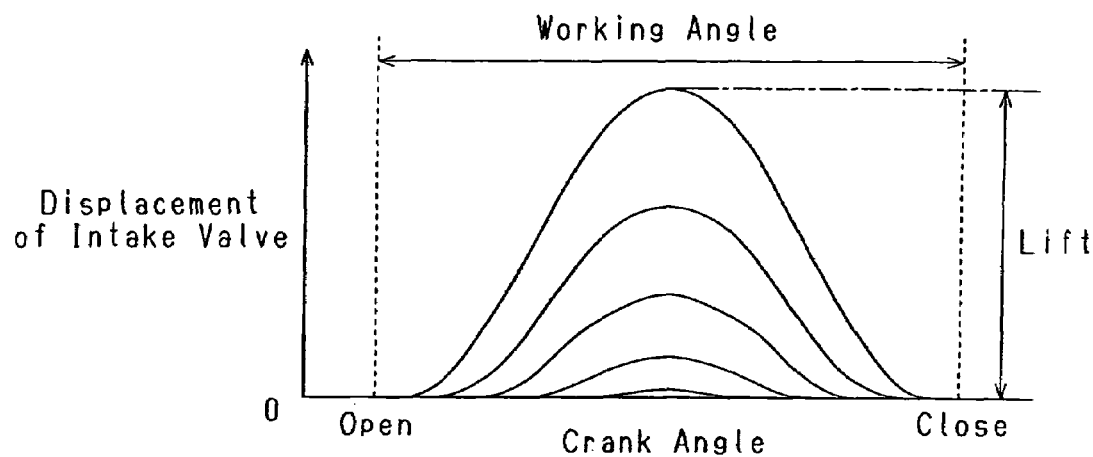
FIG. 2 is a graph showing changes in the valve lift of an intake valve.

As shown in FIG. 1, an internal combustion engine has cylinders 10 (only one is shown in the drawing). An intake valve 11 and an exhaust valve 12 are provided for each cylinder 10. In the following, only one set of a cylinder 10, an intake valve 11, and an exhaust valve 12 will be discussed as representing all the cylinders 10, the intake valves 11, and the exhaust valves 12. The intake valve 11 is actuated by an intake camshaft 14, and the exhaust valve 12 is actuated by an exhaust camshaft 15. The intake and exhaust camshafts 14, 15 rotate in synchronization with an output shaft 13 of the internal combustion engine.

A throttle valve 23 is provided in an intake passage 22 of the engine. The opening degree of the throttle valve 23 is varied according to the depression degree of an accelerator pedal, which represents the operating condition of the vehicle. By controlling the opening degree of the throttle valve 23, the amount of intake air drawn into a combustion chamber 18 through the intake passage 22 is adjusted. A variable valve actuation mechanism, which is a variable valve lift mechanism 25, is provided between the intake camshaft 14 and the intake valve 11. The variable valve lift mechanism 25 changes the working angle (the opening period of the intake valve 11) and the maximum lift of the intake valve 11 in synchronization with each other, thereby changing a lift integration value for the intake valve 11. The lift integration value corresponds to the size of the area surrounded by each bulging curve and the X-axis in FIG. 2. When actuated, the variable valve lift mechanism 25 changes the lift integration value of the intake valve 11, so that the intake air amount is adjusted. In this embodiment, the control of the intake air amount is performed by cooperation of control of the opening degree of the throttle valve 23 and control of actuation of the variable valve lift mechanism 25.

The output shaft 13 of the internal combustion engine is coupled to an automatic transmission 30. The automatic transmission 30 converts the torque of the output shaft 13 of the internal combustion engine by a predetermined gear ratio. The converted torque is then transmitted to drive wheels 33 of the vehicle through an output shaft 31 of the automatic transmission 30. The gear ratio refers to the ratio of the rotation speed of the engine output shaft 13 to the rotation speed of the transmission output shaft 31.

The automatic transmission 30 switches the gear ratio among a first gear, a second gear, a third gear, a fourth gear and a reverse gear. Switching of gears is performed based on parameters representing the operating condition of the vehicle, more specifically, the depression degree of the accelerator pedal and the vehicle speed. Further, the shifting pattern for gear ratio is switched between a normal mode (first mode) that gives priority to fuel economy and a sport mode (second mode) that gives priority to the acceleration performance.

Figure 3:
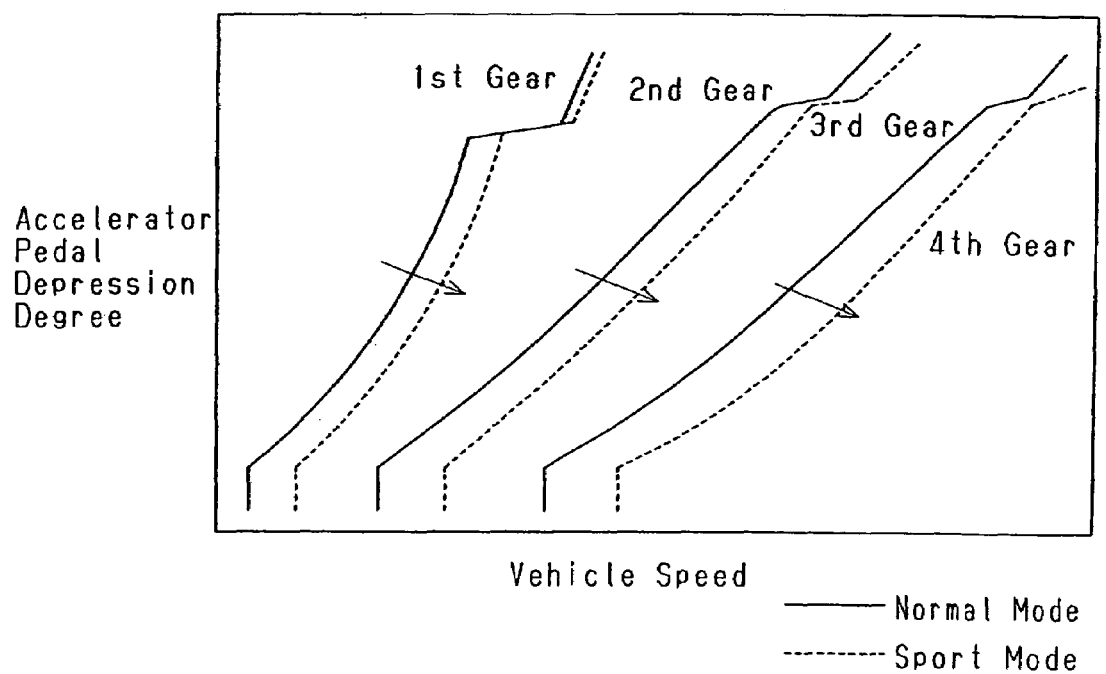
FIG. 3 is a graph showing a shifting pattern for the gear ratio of an automatic transmission.

As shown in FIG. 3, when the shifting pattern is switched to the sport mode, the gear ratio is higher than that in the normal mode. In this case, it is possible to transmit greater torque from the internal combustion engine to the automatic transmission 30, which improves the acceleration performance of the vehicle.

As shown in FIG. 1, the vehicle is provided with a switch 38 for switching the gear ratio shifting pattern between the sport mode and the normal mode. Also, to detect the operating condition of the vehicle and the load condition of the engine, the vehicle is provided with, for example, a crank sensor for detecting the rotation speed (engine rotation speed NE) of the engine output shaft 13, an accelerator pedal sensor 50 for detecting the depression degree of the accelerator pedal, and a vehicle speed sensor 51 that detects the rotation speed of the transmission output shaft 31 for detecting the vehicle speed based on the rotation speed of the output shaft 31. Further, the vehicle is provided with an intake air amount sensor 52 for detecting the intake air amount and a lift sensor 53 for detecting the lift of the intake valve 11 (actuation amount of the variable valve lift mechanism 25). The sensors and the switch 38 are connected to an electronic control unit 40 that controls the overall system of the vehicle.

The electronic control unit 40 has a memory that stores control programs for executing throttle control of the throttle valve 23, lift varying control of the intake valve 11, and gear shift control of the automatic transmission 30, and computation maps for the controls. The memory also temporarily stores the computation results. The electronic control unit 40 inputs detection signals from the sensors and a manipulation signal from the switch 38, and performs various types of computations. Based on various computation results, the electronic control unit 40 performs the throttle control, the lift varying control, and the gear shift control.

The electronic control unit 40 performs the gear shift control of the automatic transmission 30 based on a detection signal from a shift position sensor 36. At this time, the electronic control unit 40 inputs a manipulation signal from the switch 38. The electronic control unit 40 performs the shift control of the automatic transmission 30 according to the shifting pattern selected based on the manipulation signal.

Also, the electronic control unit 40 changes the control pattern of the intake air amount based on the currently selected shifting pattern. Specifically, when the shifting pattern is switched to the sport mode, the electronic control unit 40 controls the variable valve lift mechanism 25 to increase the maximum lift and the working angle of the intake valve 11 compared to those in the normal mode. The electronic control unit 40 also performs the throttle control for reducing the opening degree of the throttle valve 23 while performing the lift varying control.

As shown in FIGS. 4(A) and 4(B), working angles a1, b1 of the intake valve 11 are determined based on the load ratio KL (the ratio of the current load to the maximum load) and the rotation speed NE. When the shifting pattern is in the sport mode, the lift integration value of the intake valve 11, that is, the maximum lift and the working angle a1 are always set to be greater than the maximum lift and the working angle b1 in the normal mode.

Hereinafter, a specific procedure for the lift varying control will be described with reference to the flowchart of FIG. 5. The series of processes shown in the flowchart is repeatedly executed by the electronic control unit 40 at predetermined intervals.

In the series of processes, whether the shifting pattern for the gear ratio is in the sport mode is determined based on the position of the switch 38 (step 10). When the shifting mode is in the normal mode (NO at step S10), the lift varying control (normal lift control) for the intake valve 11 is executed by referring to the computation map of FIG. 4(B) (step S12). Specifically, based on the load ratio KL and the rotation speed NE of the engine, a control target value for the working angle (target working angle) of the intake valve 11 is set. The variable valve lift mechanism 25 is then controlled such that the actual working angle becomes equal to the target working angle.

When the shifting pattern for the gear ratio is in the sport mode (YES at step S10), a control is executed for causing the maximum lift and the working angle of the intake valve 11 to be greater than those in the normal lift control (step S11). The control is referred to as great lift control. Specifically, referring to the computation map of FIG. 4 (A), a target control value (target working angle) that is greater than that used in the normal lift control is set. The variable valve lift mechanism 25 is then controlled such that the actual working angle becomes equal to the target working angle.

The operation of the lift varying control will now be described with reference to the timing chart of FIG. 6.

Figure 6:
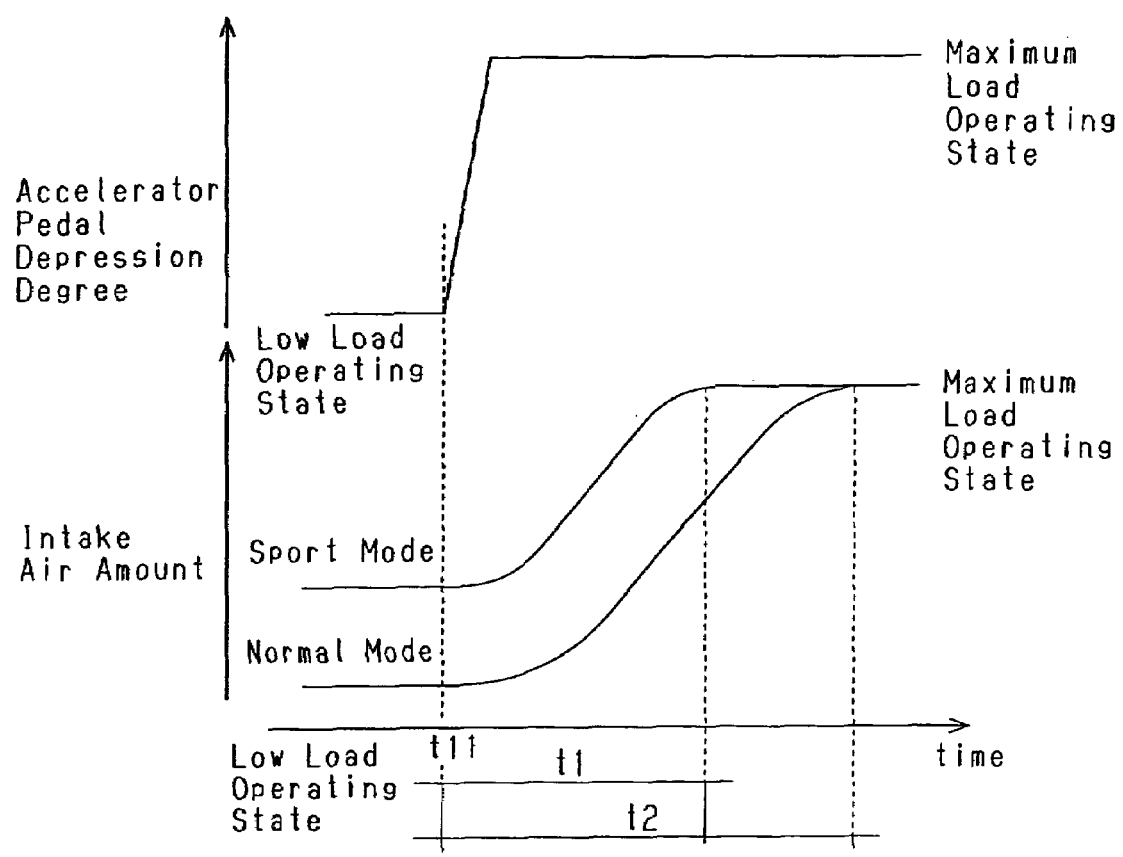
FIG. 6 is a timing chart showing an example of the procedure for changing the lift of the intake valve.

As shown in FIG. 6, when the driver steps on the accelerator pedal, the opening degree of the throttle valve 23 and the maximum lift and the working angle of the intake valve 11 are both increased, which increases the intake air amount. It takes a certain time from when the accelerator pedal starts being depressed (t11) to when the intake air amount reaches the maximum value.

In this embodiment, when the shifting pattern is set to the sport mode, the variable valve lift mechanism 25 is controlled such that the lift integration value of the intake valve 11 is always greater than that in the normal mode. In this case, the throttle valve 23 is controlled to reduce its opening degree by the amount corresponding to the increase in the intake air amount caused by the increase in the lift integration value of the intake valve 11. Thus, although pump loss occurs, the amount of increase of the intake air amount from when the accelerator pedal starts being depressed to when the intake air amount reaches the maximum value is less than that in the case of the normal mode. Therefore, when the shifting pattern is set to the sport mode, reaching time t1, which is the period from when the accelerator pedal starts being depressed (low load operating state) to when the maximum load operating state starts, is shorter than the corresponding time t2 in the normal mode. Thus, during acceleration of the vehicle, the driver's depressing the accelerator pedal quickly increases the intake air amount.

The intake air amount control apparatus of the present embodiment has the following advantages.

(1) When the shifting pattern is set to the sport mode, the lift varying control is executed so that the lift integration value of the intake valve 11 is greater than that in the normal mode. As a result, the intake air amount is quickly increased to the maximum value, and the torque generated by the internal combustion engine is quickly increased, accordingly. In addition to this, since the transmission of torque is increased by setting the shifting pattern to the sport mode, the acceleration performance of the vehicle is improved. Unlike the case where the lift integration value is increased after acceleration of the vehicle is detected, the acceleration performance of the vehicle is quickly improved.

(2) When the driver changes the position of the switch 38, the shifting pattern for the gear ratio is switched either to the sport mode or the normal mode. At the same time, the lift integration value of the intake valve 11 is switched. This permits the acceleration performance for the vehicle to be quickly improved in accordance with the demand from the driver.

The preferred embodiment may be modified as described below.

In the illustrated embodiment, the variable valve lift mechanism 25 varies the lift integration value by changing the working angle and the maximum lift of the intake valve 11 in synchronization. However, for example, only one of the working angle and the maximum lift of the intake valve 11 may be changed by altering the shape of the camshaft 14.

In the illustrated embodiments, the automatic transmission 30 is a step transmission that selects one of discrete gear ratios. However, the present invention may be embodied in a continuously variable transmission that continuously changes the gear ratio. Further, although the automatic transmission 30 has four forward gears, the present invention may be applied to automatic transmissions having three or fewer gears and an automatic transmissions having five or more gears.

In the illustrated embodiment, the present invention is applied to an automatic transmission 30, in which the shifting pattern for gear ratio is switched between the sport mode and the normal mode. However, the present invention may be applied to an automatic transmission in which the shifting pattern for gear ratio is switched among three or more modes.

The invention claimed is:

1. An intake air amount control apparatus for an internal combustion engine mounted on a vehicle provided with an automatic transmission having a gear ratio, in which the engine includes an intake passage and an intake valve having a lift integration value, the intake air amount control apparatus comprising:
    a throttle valve located in the intake passage of the engine;
    a variable valve actuation mechanism that changes the lift integration value of the intake valve of the engine; and
    an electronic control unit that controls intake air amount of the engine,
    wherein the electronic control unit controls the intake air amount by cooperation of the throttle valve and the variable valve actuation mechanism,
    wherein the electronic control unit changes the gear ratio of the automatic transmission based on a predetermined parameter representing an operating condition of the vehicle,
    wherein the electronic control unit is capable of switching a shifting pattern for the gear ratio between a first mode and a second mode, the gear ratio being set higher in the second mode than in the first mode, and
    wherein, when the shifting pattern for the gear ratio is in the second mode, the electronic control unit controls the variable valve actuation mechanism such that the lift integration value is greater than when the shifting pattern is in the first mode.

2. The intake air amount control apparatus according to claim 1, further comprising a manipulation portion mountable in the vehicle, the manipulation portion being switched between a first position for selecting the first mode of the shifting pattern for the gear ratio and a second position for selecting the second mode,
    wherein, when the manipulation portion is in the second position, the electronic control unit controls the variable valve actuation mechanism such that the lift integration value is greater than when the manipulation portion is in the first position.

3. The intake air amount control apparatus according to claim 1, wherein the electronic control unit sets a control target value for the variable valve actuation mechanism based on a load ratio and rotation speed of the engine.

4. The intake air amount control apparatus according to claim 1, wherein the variable valve actuation mechanism changes the lift integration value by changing in synchronization a maximum lift and a valve working angle for the intake valve.

5. The intake air amount control apparatus according to claim 3, wherein the control target value is based on an working angle of the intake valve.

6. The intake air amount control apparatus according to claim 4, wherein the electronic control unit controls the variable valve actuation mechanism such that an actually measured value of the working angle of the intake valve becomes equal to a control target value.

7. The intake air amount control apparatus according to claim 1, wherein the automatic transmission is a step transmission that selectively changes the gear ratio at a plurality of steps.

8. The intake air amount control apparatus according to claim 1, wherein the predetermined parameter is speed of the vehicle and depression degree of an accelerator pedal.

9. An intake air amount control method for an internal combustion engine mounted on a vehicle provided with an automatic transmission having a gear ratio, in which the engine includes an intake passage with a throttle valve therein, and an intake valve having a lift integration value, the method comprising:
    changing the gear ratio of the automatic transmission based on a predetermined parameter representing an operating condition of the vehicle;
    switching a shifting pattern for the gear ratio between a first mode and a second mode, with the gear ratio being set higher in the second mode than in the first mode when changing the gear ratio;
    controlling intake air amount of the engine by cooperation of a variable valve actuation mechanism that changes the lift integration value of the intake valve and a throttle valve located in an intake passage of the engine; and
    controlling the variable valve actuation mechanism, when the shifting pattern for the gear ratio is in the second mode, such that the lift integration value is greater than when the shifting pattern is in the first mode.

10. The intake air amount control method according to claim 9, wherein said controlling the variable valve actuation mechanism includes setting a control target value for the variable valve actuation mechanism based on a load ratio and rotation speed of the engine.

11. The intake air amount control method according to claim 9, wherein said controlling the variable valve actuation mechanism includes changing in synchronization the lift integration value by changing a maximum lift and a valve working angle for the intake valve.

12. The intake air amount control method according to claim 10, wherein the control target value is based on an working angle of the intake valve.

13. The intake air amount control method according to claim 11, further comprising actuating the variable valve actuation mechanism such that an actually measured value of the working angle of the intake valve becomes equal to a control target value.

14. The intake air amount control method according to claim 9, wherein the automatic transmission is a step transmission that selectively changes the gear ratio at a plurality of steps.

15. The intake air amount control method according to claim 9, wherein the predetermined parameter is speed of the vehicle and depression degree of an accelerator pedal.

* * * * *